US012449751B2

(12) United States Patent
Izumi

(10) Patent No.: US 12,449,751 B2
(45) Date of Patent: Oct. 21, 2025

(54) IMAGE FORMING APPARATUS HAVING SERVICE SUMMONS CONTROL AND CORRESPONDING METHOD

(71) Applicant: TOSHIBA TEC KABUSHIKI KAISHA, Tokyo (JP)

(72) Inventor: Takao Izumi, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/504,187

(22) Filed: Nov. 8, 2023

(65) Prior Publication Data

US 2024/0231265 A1 Jul. 11, 2024

(30) Foreign Application Priority Data

Jan. 11, 2023 (JP) ................................ 2023-002140

(51) Int. Cl.
*G03G 15/00* (2006.01)
*G03G 15/02* (2006.01)

(52) U.S. Cl.
CPC ..... *G03G 15/5016* (2013.01); *G03G 15/0258* (2013.01); *G03G 15/553* (2013.01)

(58) Field of Classification Search
CPC ........... G03G 15/0258; G03G 15/0225; G03G 15/0291; G03G 15/5016; G03G 15/5079; G03G 15/553
USPC .......................... 399/12, 31, 81, 98, 99, 100
See application file for complete search history.

(56) References Cited

U.S. PATENT DOCUMENTS

| | | | | |
|---|---|---|---|---|
| 4,038,546 A * | 7/1977 | Jasinski | G03G 15/0258 | 361/229 |
| 6,711,363 B1 * | 3/2004 | Wayman | G03G 15/0258 | 399/37 |
| 2006/0045559 A1 * | 3/2006 | Zona | G03G 15/0258 | 399/100 |
| 2010/0067935 A1 * | 3/2010 | Nakamura | G03G 15/553 | 399/71 |
| 2010/0086316 A1 * | 4/2010 | Sekovski | G03G 15/0291 | 399/8 |
| 2011/0200352 A1 * | 8/2011 | Yamashita | G03G 15/0258 | 399/128 |
| 2020/0150571 A1 * | 5/2020 | Seki | G03G 15/011 | |

(Continued)

FOREIGN PATENT DOCUMENTS

| | | |
|---|---|---|
| JP | 59-93466 | 5/1984 |
| JP | 60-76765 | 5/1985 |

(Continued)

*Primary Examiner* — Robert B Beatty
(74) *Attorney, Agent, or Firm* — Amin, Turocy & Watson, LLP

(57) ABSTRACT

According to one embodiment, an image forming apparatus includes a printing unit, a count unit, and a control unit. The printing unit includes a member, the self-maintenance of which is performable by a user, and prints an image on a printing medium. The count unit counts a count value indicating usage time of the member. The control unit outputs, when determining that the count value counted by the count unit is equal to or greater than a first threshold value, output information to an information processing device, in which the output information includes information indicating that the count value is equal to or greater than the first threshold value.

16 Claims, 5 Drawing Sheets

(56) References Cited

U.S. PATENT DOCUMENTS

| | | | | |
|---|---|---|---|---|
| 2020/0310333 | A1* | 10/2020 | Sato | G03G 21/0076 |
| 2023/0021525 | A1* | 1/2023 | Fujita | G03G 21/206 |

FOREIGN PATENT DOCUMENTS

| | | |
|---|---|---|
| JP | 07-311501 | 11/1995 |
| JP | 2003-15483 | 1/2003 |
| JP | 2007-206517 | 8/2007 |

* cited by examiner

IMAGE FORMING APPARATUS HAVING SERVICE SUMMONS CONTROL AND CORRESPONDING METHOD

CROSS-REFERENCE TO RELATED APPLICATION

This application is based upon and claims the benefit of priority from Japanese Patent Application No. 2023-002140, filed on Jan. 11, 2023, the entire contents of which are incorporated herein by reference.

FIELD

Embodiments described herein relate generally to an image forming apparatus and a method.

BACKGROUND

In the related art, there is known an image forming apparatus having a configuration in which, if a count value indicating usage time of a member, the self-maintenance of which is performable by a user, is counted and the counted count value is equal to or greater than a threshold value, an image is displayed to urge the user to perform the self-maintenance thereof and to receive an operation of resetting the count value. This function is provided to prevent the user from urgently summoning a service person for emergency maintenance of the image forming apparatus.

Here, in the case of the image forming apparatus of the related art, if a selection operation is performed on a button, among the buttons included in an image that receives an operation of resetting a count value, that allows the image forming apparatus to identify that self-maintenance is completed, the count value is reset. However, even though a user looks at the image, the user may urgently summon a service person without performing the self-maintenance.

DETAILED DESCRIPTION

Figure 1:
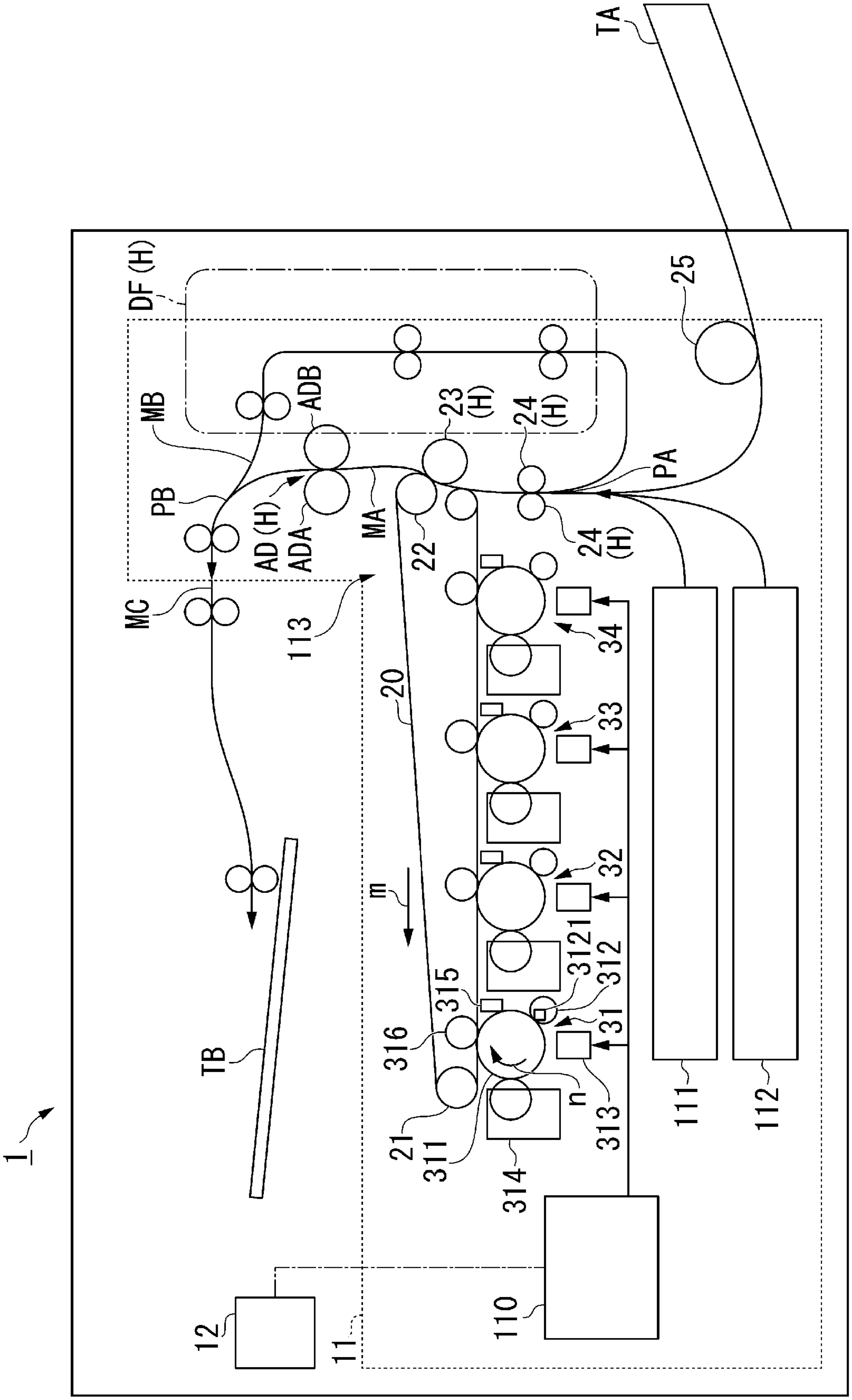
FIG. 1 is a diagram illustrating an example of a configuration of an image forming apparatus according to an embodiment.

An aspect of the present embodiment is to provide an image forming apparatus and a method capable of preventing a user from urgently summoning a service person.

In general, according to one embodiment, an image forming apparatus includes a printing unit, a count unit, and a control unit. The printing unit includes a member, the self-maintenance of which is performable by a user, and prints an image on a printing medium. The count unit counts a count value indicating usage time of the member. The control unit outputs, when determining that the count value counted by the count unit is equal to or greater than a first threshold value, output information to an information processing device, in which the output information includes information indicating that the count value is equal to or greater than the first threshold value.

An image forming apparatus according to an embodiment will be described with reference to the drawings. In each drawing, the same components will be denoted by the same reference numerals. An image forming apparatus 1 will be described as an example of the image forming apparatus according to the embodiment.

(Configuration of Image Forming Apparatus)

A configuration of the image forming apparatus 1 will be described with reference to FIG. 1. FIG. 1 is a diagram illustrating an example of the configuration of the image forming apparatus 1 according to the embodiment.

The image forming apparatus 1 is an apparatus that forms an image on a printing medium. For example, the image forming apparatus 1 is a multifunction printer, a copy machine, a printer, or the like. The image forming apparatus 1 is disposed in, for example, a workplace. The printing medium is a medium on which the image forming apparatus 1 performs processing such as image formation. The printing medium may be any sheet-like medium capable of forming an image on at least one of both surfaces. For example, the printing medium is printing paper, plastic film, or the like.

The image forming apparatus 1 identifies the type of printing medium on which processing desired by a user is to be performed in response to an operation received from the user. The printing medium is classified into various types based on a size of the printing medium, a thickness of the printing medium, a material of the printing medium, and the like.

The image forming apparatus 1 forms a toner image on a predetermined type of printing medium in response to the operation received from the user. After forming the toner image on the printing medium, the image forming apparatus 1 heats the printing medium and fixes the toner image as an image on the printing medium.

The image forming apparatus 1 includes, for example, a printer unit 11, a control panel 12, a manual feed tray TA, and a paper discharge tray TB. The image forming apparatus 1 may include other members, other devices, and the like in addition to the printer unit 11, the control panel 12, the manual feed tray TA, and the paper discharge tray TB.

The printer unit 11 includes a control unit 110, a paper feed cassette 111, a paper feed cassette 112, and an image forming unit 113. The printer unit 11 may include other members, other devices, and the like in addition to the control unit 110, the paper feed cassette 111, the paper feed cassette 112, and the image forming unit 113.

The control unit 110 controls the image forming apparatus 1 in the overall manner. In other words, the control unit 110 controls each of the printer unit 11, the control panel 12, and the image forming unit 113.

The paper feed cassette 111 stores the type of printing medium desired by the user.

The paper feed cassette 112 stores the type of printing medium desired by the user.

The control panel 12 includes an operation receiving unit and a display unit.

The operation receiving unit receives an operation from the user. The operation receiving unit is an input device such as a touch pad or an input key. The operation receiving unit outputs information indicating the operation received from the user to the control unit 110.

The display unit displays an image in response to the operation received via the operation receiving unit. The display unit is an image display device, and is, for example, a liquid crystal display, an organic electro luminescence (EL) display, or the like. It is noted that the display unit may be formed to be integrated with the operation receiving unit as a touch panel.

The image forming unit 113 conveys the printing medium, forms the toner image on the printing medium, and fixes the toner image as an image on the printing medium under control from the control unit 110. This toner image is a toner image of an image indicated by image data acquired from the control unit 110. The configuration of the image forming unit 113 will be described later. Forming a toner image on a printing medium may also be referred to as forming an image on a printing medium.

For convenience of description, processing of forming a toner image on a printing medium and fixing the toner image as an image on the printing medium by heating the printing medium will be described as printing.

(Configuration of Image Forming Unit)

Hereinafter, the Configuration of the Image Forming Unit 113 will be described below.

The image forming unit 113 includes an intermediate transfer belt 20. The image forming unit 113 includes a driven roller 21, a backup roller 22, a secondary transfer roller 23, two registration rollers 24, and a manual paper feed roller 25. The image forming unit 113 includes four sets of image forming stations such as an image forming station 31, an image forming station 32, an image forming station 33, and an image forming station 34. The image forming unit 113 includes a fixing device AD and a double-sided printing device DF.

The intermediate transfer belt 20 is a belt to which the toner image is primarily transferred by the four sets of image forming stations. The intermediate transfer belt 20 is supported by the driven roller 21, the backup roller 22, and the like. The intermediate transfer belt 20 rotates in a direction indicated by an arrow m in FIG. 1. More specifically, the image forming unit 113 rotates the intermediate transfer belt 20 in the direction using a motor (not illustrated) in response to the control from the control unit 110.

The image forming station 31 is an image forming station for forming a Y (yellow) image. The image forming station 32 is an image forming station for forming an M (magenta) image. The image forming station 33 is an image forming station for forming a C (cyan) image. The image forming station 34 is an image forming station for forming a K (black) image. In the image forming unit 113, these four sets of image forming stations are arranged below the intermediate transfer belt 20 in the rotation direction of the intermediate transfer belt 20.

The image forming station 31 includes a photoreceptor drum 311, a charging charger 312, an exposure scanning head 313, a developing device 314, a photoreceptor cleaner 315, and a primary transfer roller 316. In the image forming station 31, the charging charger 312, the exposure scanning head 313, the developing device 314, the photoreceptor cleaner 315, and the primary transfer roller 316 are arranged around the photoreceptor drum 311 configured to rotate in a direction indicated by an arrow n in FIG. 1. The primary transfer roller 316 faces the photoreceptor drum 311 with the intermediate transfer belt 20 interposed therebetween.

The charging charger 312 charges the photoreceptor drum 311. The charging charger 312 includes a charging member such as a charging wire or a needle, and charges the photoreceptor drum 311 by discharge from the charging member. As described above, an oxidation product, toner scattered around the charging member, and the like may adhere to the charging member of the charging charger 312 during discharge. Such adhesion of the oxidation product, the toner, and the like causes the photoreceptor drum 311 to be unevenly charged. If the photoreceptor drum 311 is unevenly charged, the image forming apparatus 1 may generate streaks in the image formed on the printing medium, which is undesirable.

In order to solve this problem, the charging charger 312 is provided with a cleaning member 3121 that removes the oxidation product, the toner, and the like adhering to the charging member in response to an operation received from the user. In FIG. 1, the cleaning member 3121 is drawn as a rectangular object in order to prevent the drawing from becoming complicated. In FIG. 1, a position at which the cleaning member 3121 is provided is drawn at a different position from the actual position in order to prevent the drawing from becoming complicated.

Figure 2:
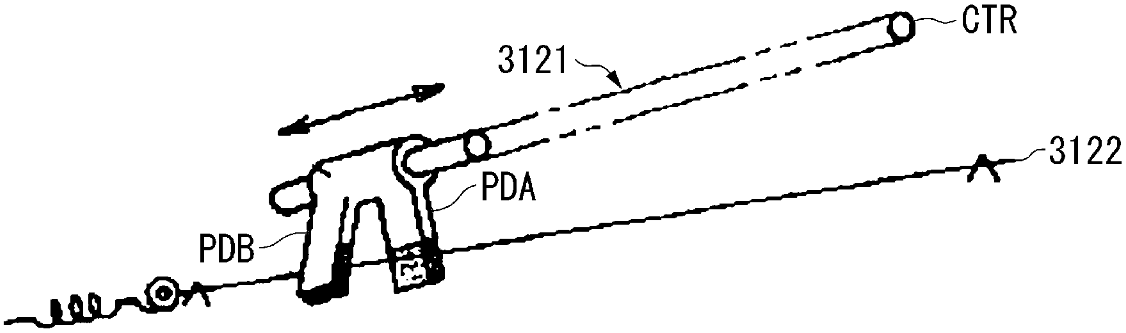
FIG. 2 is a diagram illustrating an example of a cleaning member provided in a charging charger.

FIG. 2 is a diagram illustrating an example of the cleaning member 3121 provided in the charging charger 312. A charging member 3122 illustrated in FIG. 2 is an example of a charging member. That is, FIG. 2 illustrates the charging member 3122 of the charging charger 312 together with the cleaning member 3121. In FIG. 2, in order to prevent the drawing from becoming complicated, among the members provided in the charging charger 312, illustration of members other than two members such as the cleaning member 3121 and the charging member 3122 is omitted.

In the example illustrated in FIG. 2, the charging member 3122 is a charging wire. In this case, as illustrated in FIG. 2, the cleaning member 3121 includes, as two cleaning pads that slidably sandwich the charging member 3122, a cleaning pad PDA, a cleaning pad PDB, and a rod-shaped operation receiving member CTR provided with these two cleaning pads. The operation receiving member CTR is a member that receives an operation from a user. If the user moves the operation receiving member CTR forwards and rearwards along the charging member 3122, these two cleaning pads can wipe off the oxidation product, the toner, and the like adhering to the charging member 3122. In other words, if the user moves the operation receiving member CTR forwards and rearwards along an arrow illustrated in FIG. 2, these two cleaning pads can wipe off the oxidation product, the toner, and the like adhering to the charging member 3122.

Figure 3:
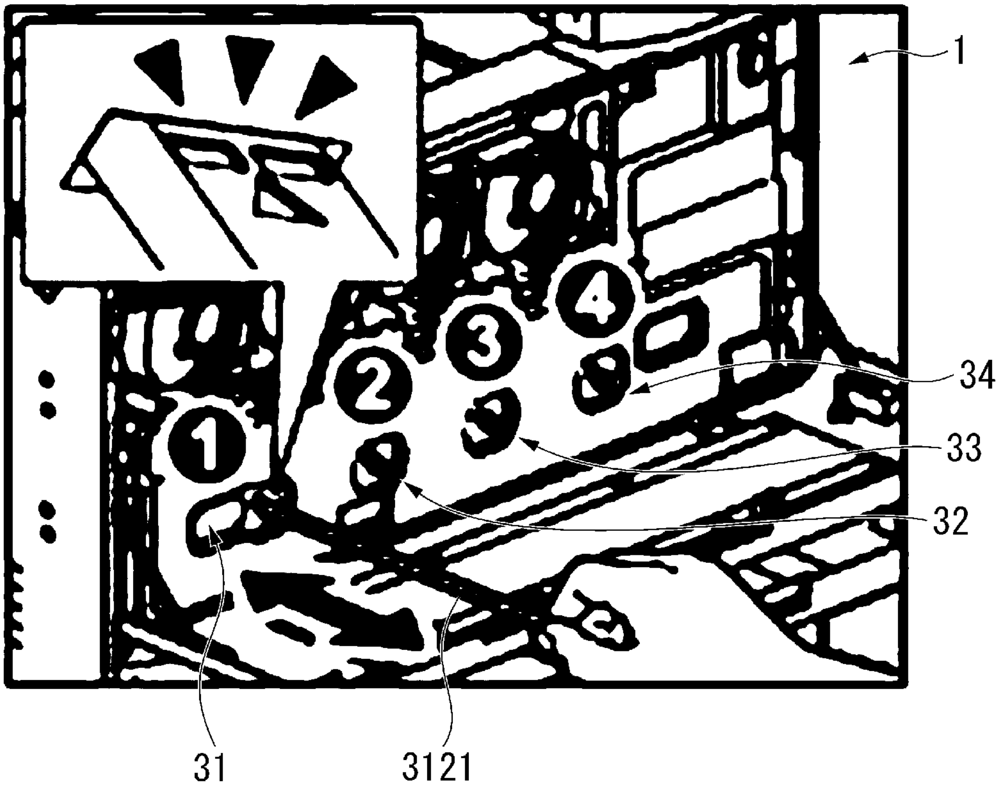
FIG. 3 is a diagram illustrating an example of how a user operates the cleaning member provided in the charging charger to wipe off an oxidation product, toner, and the like adhering to a charging member.

FIG. 3 is a diagram illustrating an example of how a user operates the cleaning member 3121 provided in the charging charger 312 to wipe off the oxidation product, the toner, and the like adhering to the charging member 3122. FIG. 3 illustrates the image forming apparatus 1 in a state in which a front cover thereof is open. Therefore, in FIG. 3, the four sets of image forming stations are visible from the outside of the image forming apparatus 1. In the example illustrated in FIG. 3, the user moves the cleaning member 3121 of the image forming station 31 forwards and rearwards along an arrow illustrated in FIG. 3. Accordingly, the user can wipe off the oxidation product, the toner, and the like adhering to the charging member 3122 of the charging charger 312 of the image forming station 31. In FIG. 3, since the charging member 3122 of the charging charger 312 is located behind other members provided in the image forming apparatus 1, the charging member 3122 is not visible.

The exposure scanning head 313 forms an electrostatic latent image on the surface of the photoreceptor drum 311. The exposure scanning head 313 includes, for example, a light emitting unit that emits light and a slit glass that allows the light emitted from the light emitting unit to be transmitted therethrough. The slit glass of the exposure scanning head 313 is provided with a cleaning member that removes an oxidation product, toner, and the like adhering to the slit glass in response to an operation received from the user. In FIG. 1, illustration of the light emitting unit and the slit glass is omitted.

The developing device 314 develops the electrostatic latent image formed on the surface of the photoreceptor drum 311 as a toner image.

The toner image developed on the surface of the photoreceptor drum 311 is transferred to the intermediate transfer belt 20.

The configuration of each of the image forming station 32, the image forming station 33, and the image forming station 34 is similar to the configuration of the image forming station 31. Therefore, hereinafter, description of the respective configurations of the image forming station 32, the image forming station 33, and the image forming station 34 will be omitted.

The secondary transfer roller 23 faces the backup roller 22 with the intermediate transfer belt 20 interposed therebetween. The secondary transfer roller 23 secondarily transfers the toner image that is primarily transferred to the intermediate transfer belt 20 to a printing medium that passes through a space between the secondary transfer roller 23 and the intermediate transfer belt 20.

The two registration rollers 24 convey, to the space between the secondary transfer roller 23 and the intermediate transfer belt 20, the printing medium taken out from each of the paper feed cassette 111, the paper feed cassette 112, and the manual feed tray TA by a conveyance mechanism (not illustrated).

The manual paper feed roller 25 takes out the printing medium from the manual feed tray TA and conveys the printing medium to the two registration rollers 24.

The printing medium to which the toner image is secondarily transferred by the secondary transfer roller 23 is conveyed to the fixing device AD that fixes the toner image formed on the printing medium as an image. The fixing device AD fixes, as an image, the toner image that is secondarily transferred to the printing medium on the printing medium while conveying the printing medium using a roller. Accordingly, the image is formed on the printing medium.

The fixing device AD is a device that fixes the toner image on the printing medium to which the toner image is secondarily transferred by the secondary transfer roller 23. More specifically, the fixing device AD heats the printing medium while conveying the printing medium using a roller, and the same fixes, on the printing medium, the toner image that is secondarily transferred to the printing medium. The fixing device AD includes, for example, a fixing member ADA, a pressurizing member ADB facing the fixing member ADA, and a heating unit that heats the fixing member ADA.

The fixing member ADA is a member having an endless circumferential surface. For example, the fixing member ADA is a belt-shaped member that constitutes a roller. Therefore, the fixing member ADA may be referred to as a fixing roller. The fixing member ADA contacts the outer peripheral surface of the pressurizing member ADB. The fixing member ADA rotates together with the pressurizing member ADB in contact with the fixing member ADA. The heating unit is provided in the fixing member ADA. A support member that rotatably supports the fixing member ADA is provided in the fixing member ADA. In FIG. 1, illustration of the support member is omitted to simplify the drawing.

The pressurizing member ADB is a roller that contacts the outer peripheral surface of the fixing member ADA. The driving force of a motor is transmitted to the pressurizing member ADB via a gear or the like. In other words, the pressurizing member ADB is rotated by driving the motor. The pressurizing member ADB is pressed against the outer peripheral surface of the fixing member ADA by a biasing member such as a spring. The pressurizing member ADB forms a nip with the fixing member ADA by being pressed against the fixing member ADA. In other words, the pressurizing member ADB forms the nip with the fixing member ADA by contacting the fixing member ADA. In the fixing device AD, instead of the configuration in which the pressurizing member ADB is pressed against the outer peripheral surface of the fixing member ADA by the biasing member, the fixing member ADA may be pressed against the outer circumferential surface of the pressurizing member ADB by the biasing member.

The heating unit heats a heated region that can be heated by the heating unit among the regions on the outer peripheral surface of the fixing member ADA. Accordingly, the heating unit heats the surface of the printing medium passing through a space between the fixing member ADA and the pressurizing member ADB.

The double-sided printing device DF is a device that conveys, to the two registration rollers 24, the printing medium having the toner image fixed on the surface thereof as an image by the fixing device AD. The printing medium, the front surface and the back surface of which are turned over, is conveyed to the double-sided printing device DF. Therefore, an image is formed, via the secondary transfer roller 23 and the fixing device AD, on the back surface of the printing medium conveyed to a space between the two registration rollers 24 via the double-sided printing device DF.

(Operation of Image Forming Unit)

The operation of the image forming unit 113 will be described below.

First, the operations of the four sets of image forming stations will be described while the operation of the image forming station 31 is taken as an example.

The image forming station 31 charges the photoreceptor drum 311 using the charging charger 312 and then exposes the photoreceptor drum 311 using the exposure scanning head 313. Accordingly, the image forming station 31 forms an electrostatic latent image on the photoreceptor drum 311. Thereafter, the image forming station 31 causes the developing device 314 to develop the electrostatic latent image on the surface of the photoreceptor drum 311. The developing device 314 develops the electrostatic latent image on the photoreceptor drum 311 as a toner image using a two-component developer formed of toner and a carrier. The primary transfer roller 316 primarily transfers the toner image formed as described above on the photoreceptor drum 311 to the intermediate transfer belt 20. After this primary transfer is performed, the photoreceptor cleaner 315 removes toner remaining on the photoreceptor drum 311.

Each of the image forming station 31, the image forming station 32, the image forming station 33, and the image forming station 34 forms a color toner image on the intermediate transfer belt 20 by the primary transfer roller 316. The color toner image is formed by sequentially overlapping toner images of Y (yellow), M (magenta), C (cyan), and K (black).

Next, the operation of the secondary transfer roller 23 will be described. The secondary transfer roller 23 secondarily and collectively transfers the color toner images formed on the intermediate transfer belt 20 to the printing medium passing through the space between the secondary transfer roller 23 and the intermediate transfer belt 20. In the following description, if the "toner image" is described, either a color toner image or a toner image using only one color may be used. The toner image may be a toner image using decolorable toner.

Next, among the operations of the image forming unit 113, the operation of conveying the printing medium will be described.

At a nip formed between the two registration rollers 24, a conveyance mechanism (not illustrated) bends the printing medium taken out from each of the paper feed cassette 111, the paper feed cassette 112, and the manual feed tray TA. Accordingly, the positions of the tips of the printing media are aligned. Thereafter, the two registration rollers 24 convey the printing medium to the space between the secondary transfer roller 23 and the intermediate transfer belt 20 in accordance with a timing at which the image forming unit 113 transfers the toner image to the printing medium. Conveyance paths along which the printing media respectively taken out from the paper feed cassette 111, the paper feed cassette 112, and the manual feed tray TA are conveyed to the two registration rollers 24 merge at a merging portion PA illustrated in FIG. 1.

In the image forming unit 113, three conveyance paths including a conveyance path MA, a conveyance path MB, and a conveyance path MC are formed by the two registration rollers 24, the fixing device AD, and a plurality of rollers in the double-sided printing device DF. The conveyance path MA is a conveyance path formed to extend from the merging portion PA to a branching portion PB illustrated in FIG. 1. The conveyance path MB is a conveyance path passing through the inside of the double-sided printing device DF, and is a conveyance path formed to extend from the branching portion PB to the merging portion PA. The conveyance path MC is a conveyance path formed to extend from the branching portion PB to the paper discharge tray TB.

The two registration rollers 24 start rotation thereof in accordance with the position of the toner image formed on the rotating intermediate transfer belt 20, and move the printing medium to the position of the secondary transfer roller 23. Accordingly, the toner image formed on the intermediate transfer belt 20 is secondarily transferred to the printing medium by the secondary transfer roller 23. After the toner image is secondarily transferred to the printing medium, the secondary transfer roller 23 conveys the printing medium to the fixing device AD along the conveyance path MA. The fixing device AD fixes, on the printing medium as an image, the toner image secondarily transferred to the printing medium conveyed from the secondary transfer roller 23 while conveying the printing medium. As a result, the toner image that is secondarily transferred is formed on the printing medium as the image. The fixing device AD conveys the printing medium to the conveyance path MC after the image is formed on the printing medium. Then, the printing medium conveyed to the conveyance path MC is discharged by a roller (not illustrated).

The fixing device AD heats the printing medium passing through a space between the fixing member ADA and the pressurizing member ADB by heating using the heating unit, and fixes the toner image formed on the printing medium by the four sets of image forming stations to the printing medium. Accordingly, the toner image that is secondarily transferred by the secondary transfer roller 23 is formed on the printing medium as an image. The fixing device AD conveys the printing medium to the conveyance path MC after the image is formed on the printing medium. Then, the printing medium conveyed to the conveyance path MC is discharged by a roller (not illustrated).

In the case of double-sided printing, after the entire printing medium passes through the branching portion PB after the image is formed on the surface, a roller (not illustrated) conveys the printing medium to the conveyance path MB by performing switchback. Accordingly, the front surface and the back surface of the printing medium are turned over. Thereafter, the plurality of rollers in the double-sided printing device DF convey the printing medium to the nip formed between the two registration rollers 24 along the conveyance path MB. Then, the printing medium, the front surface and the back surface of which are turned over, is conveyed along the conveyance path MA via the two registration rollers 24, and the toner image is fixed as an image by the fixing device AD. As a result, the image is also formed on the back surface of the printing medium. The fixing device AD conveys the printing medium, the back surface of which has the image formed thereon, to the conveyance path MC, and discharges the printing medium. The image formed on the front surface of the printing medium and the image formed on the back surface of the printing medium may be different images or may be the same image.

In this manner, the secondary transfer roller 23, the two registration rollers 24, the fixing device AD, and the various rollers in the double-sided printing device DF serve as a conveyance unit H configured to convey the printing medium in the image forming apparatus 1.

The image forming apparatus 1 having the above-described configuration counts a count value indicating usage time of a member, the self-maintenance of which is performable by a user. If the counted count value is equal to or greater than a threshold value, the image forming apparatus 1 can display an image that urges the user to perform the self-maintenance thereof and receives an operation of resetting the count value. However, even though the user looks at the image, the user may urgently summon a service person without performing the self-maintenance thereof. This circumstance is undesirable because summoning the service person without performing the self-maintenance may make the work of the service person more difficult. In addition, the user may not perform the self-maintenance even after looking at the image. This may shorten the life of the image forming apparatus 1, which is undesirable. For convenience of description, the member will be referred to as a target member.

Here, the image forming apparatus 1 counts the count value indicating the usage time of the member, the self-maintenance of which is performable by the user. When determining that the counted count value is equal to or greater than a predetermined first threshold value THA, the image forming apparatus 1 outputs, to an information processing device, output information including information indicating that the count value is equal to or greater than the first threshold value THA. The count value may be, for example, the usage time itself of the target member, the usage time of the printer unit 11, the usage time of the image forming apparatus 1, the number of sheets printed by the printer unit 11, or other values indicating the usage time of the target member. As an example, a case in which the count value is the usage time of the printer unit 11 will be described. In this case, the first threshold value THA may be any time if the time is shorter than the time during which the target member is estimated to be usable without any problems even if self-maintenance is not performed thereon. As an example, a description will be given as to a case in which the first threshold value THA is 168 hours (shorter than one week) shorter than the time during which the member is estimated to be usable without any problems even if self-maintenance is not performed thereon. A method of counting the usage time of the printer unit 11 as the count value may be a known method or a method to be developed in the future. The information may be, for example, information indicating that maintenance by a service person is required, information indicating a request to summon a service person, and the like, but the information is not limited thereto. The information processing device to which the output information from the image forming apparatus 1 is output is a PC managed by a service person, a server of a company to which the service person belongs, a PC managed by a user, and the like, but the information processing device is not limited thereto. As a result, the image forming apparatus 1 can summon a service person before a problem occurs in the target member. Accordingly, the image forming apparatus 1 can prevent the user from urgently summoning a service person. In addition thereto, the image forming apparatus 1 can generate a time margin for the service person to schedule maintenance of the image forming apparatus 1, and can also prevent a problem occurring in a case where the user does not perform self-maintenance of the member.

(Functional Configuration of Control Unit)

Figure 4:
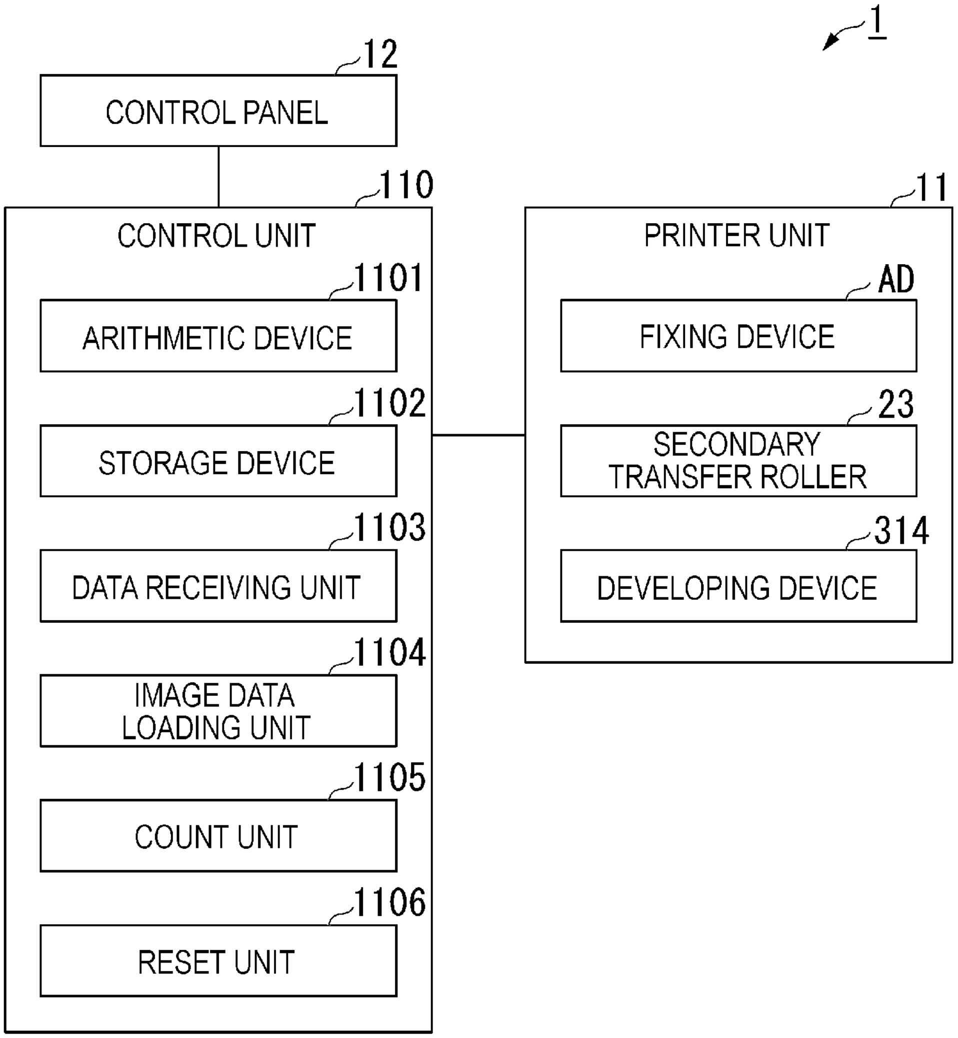
FIG. 4 is a diagram illustrating an example of a functional configuration of a control unit.

Next, a functional configuration of the control unit 110 will be described with reference to FIG. 4. FIG. 4 is a diagram illustrating an example of the functional configuration of the control unit 110.

As illustrated in FIG. 4, the control unit 110 is communicably connected to each of the printer unit 11 and the control panel 12. The control unit 110 includes an arithmetic device 1101, a storage device 1102, a data receiving unit 1103, an image data loading unit 1104, a count unit 1105, and a reset unit 1106. At least one of the count unit 1105 and the reset unit 1106 may be configured as a functional unit separate from the control unit 110.

The arithmetic device 1101 is, for example, a central processing unit (CPU), an application specific integrated circuit (ASIC), or the like. The arithmetic device 1101 controls each of the printer unit 11 and the control panel 12 according to an image processing program stored in the storage device 1102.

The storage device 1102 is a read only memory (ROM), a random access memory (RAN), a hard disk drive (HDD), a solid state drive (SSD), or the like. The storage device 1102 may be separately provided from the control unit 110. The storage device 1102 is an example of a storage unit.

The data receiving unit 1103 receives printing data (for example, data described in a page description language or the like) indicating an image to be printed from a host such as a personal computer (PC), and stores the received printing data in the storage device 1102.

The image data loading unit 1104 determines a printing condition from the printing data stored in the storage device 1102 by the data receiving unit 1103, thereby loading data (for example, raster data or the like) that can be printed by the printer unit 11 and storing the data in the storage device 1102.

The count unit 1105 counts a count value indicating the usage time of the target member. For example, the count unit 1105 stores the counted count value in the storage device 1102 every time the count value is counted. In this case, if the count value is already stored in the storage device 1102, the count unit 1105 updates the count value stored in the storage device 1102 to a newly counted count value.

The reset unit 1106 resets the count value counted by the count unit 1105 in response to an operation received from the user. The image forming apparatus 1 may have a configuration that does not include the reset unit 1106. In this case, the count value counted by the count unit 1105 cannot be reset by the operation from the user, and the count value is reset by a command input from a service person.

(Processing of Outputting Output Information According to Count Value Indicating Usage Time of Target Member)

Figure 5:
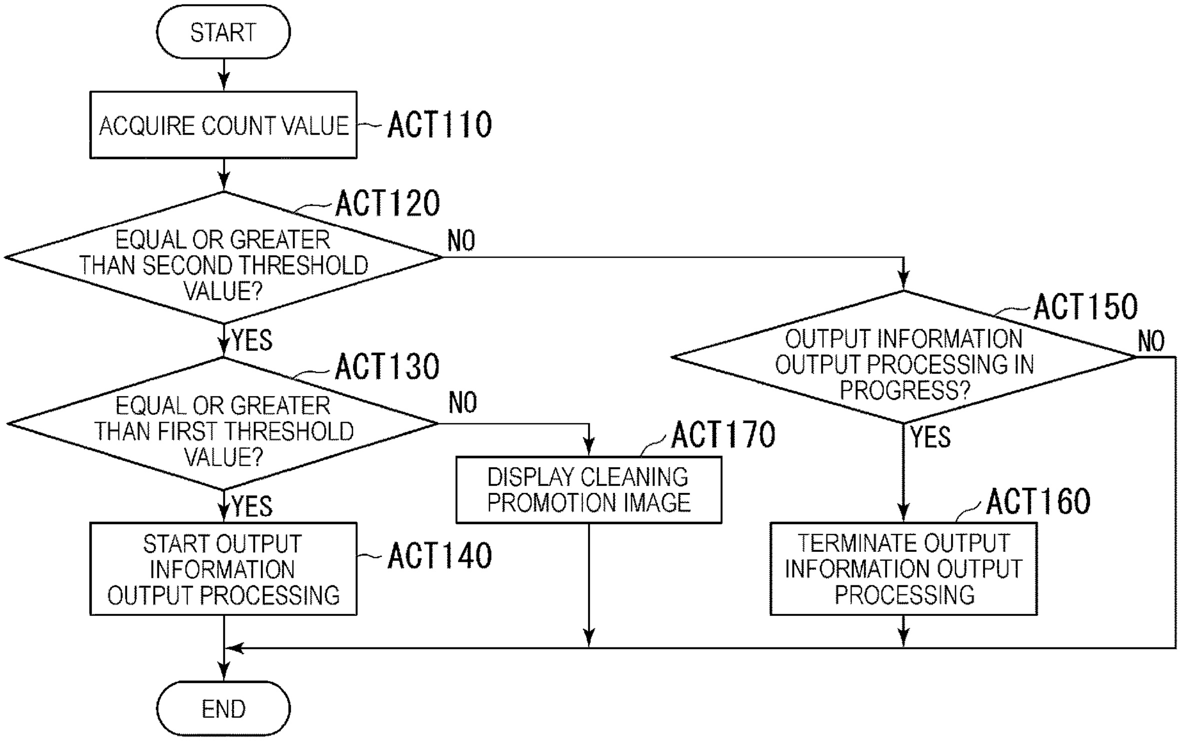
FIG. 5 is a diagram illustrating an example of a flow of processing of outputting output information according to a count value indicating usage time of a target member.

With reference to FIG. 5, processing of outputting output information according to the count value indicating usage time of the target member will be described. FIG. 5 is a diagram illustrating an example of a flow of processing of outputting the output information according to the count value indicating the usage time of the target member. The image forming apparatus 1 repeatedly performs the processing of the flowchart illustrated in FIG. 5, for example, every time a predetermined determination start condition is satisfied. Examples of the determination start condition include "a predetermined time comes", "a predetermined day of the week comes", and "a predetermined date comes", but the present embodiment is not limited thereto. For example, if the determination start condition is "the predetermined time comes", the image forming apparatus 1 periodically performs the processing. As an example, a description will be given as to a case in which the count value is counted by the count unit 1105 at a timing before the processing in ACT 110 illustrated in FIG. 5 is performed. That is, at this timing, the count value is stored in the storage device 1102 by the count unit 1105.

After the determination start condition is satisfied, the control unit 110 reads the count value stored in the storage device 1102 by the count unit 1105 from the storage device 1102 and acquires the count value (ACT 110). In FIG. 5, the processing in ACT 110 is indicated by "acquire count value".

The control unit 110 determines whether the count value acquired in ACT 110 is equal to or greater than a second threshold value THB (ACT 120). The second threshold value THB may be any value as long as the same is equal to or less than the first threshold value THA. In FIG. 5, the processing in ACT 120 is indicated by "equal to or greater than second threshold value?".

When determining that the count value acquired in ACT 110 is equal to or greater than the second threshold value THB (ACT 120—YES), the control unit 110 determines whether the count value is equal to or greater than the first threshold value THA (ACT 130). In FIG. 5, the processing in ACT 130 is indicated by "equal to or greater than the first threshold value?".

If determining that the count value acquired in ACT 110 is equal to or greater than the first threshold value THA (ACT 130—YES), the control unit 110 generates the above-mentioned output information and starts output information output processing of periodically outputting the generated output information to the above-mentioned information processing device (ACT 140). Here, a method of implementing the output information output processing may be a known method or a method to be developed in the future. If the output information output processing already starts in ACT 140, for example, the control unit 110 continues the output information output processing without doing anything in ACT 140. In the output information output processing, for example, the output information is output to the information processing device every time a predetermined time elapses. The predetermined time is, for example, 36 hours, but may be shorter than 36 hours or longer than 36 hours. After the processing in ACT 140 is performed, the control unit 110 terminates the processing of the flowchart illustrated in FIG. 5.

On the other hand, when determining that the count value acquired in ACT 110 is less than the first threshold value THA (ACT 130—NO), the control unit 110 generates a cleaning promotion image and displays the generated cleaning promotion image on the display unit of the control panel 12 (ACT 170). The cleaning promotion image is an image including information that urges the user to perform self-maintenance. The cleaning promotion image is, for example, an image including a text that urges the user to perform self-maintenance, an image that urges the user to perform self-maintenance, and the like, but the present embodiment is not limited thereto. The cleaning promotion image further includes an operation receiving image that receives an operation of causing the image forming apparatus 1 to identify that the self-maintenance is performed by the user. The operation receiving image is also an image that receives an operation of causing the reset unit 1106 to reset the count value. Therefore, if a selection operation is performed on the operation receiving image, the reset unit 1106 identifies that the self-maintenance is performed by the user and resets the count value counted by the count unit 1105 to an initial value. The initial value is, for example, 0, but the present embodiment is not limited thereto. The selection operation is, for example, a click, a tap, or the like, but the present embodiment is not limited thereto. When displaying the cleaning promotion image on the display unit, the control unit 110 maintains the display of the cleaning promotion image on the display unit until the selection operation is performed on the operation receiving image. The control unit 110 deletes the cleaning promotion image from the display unit if the selection operation is performed on the operation receiving image. After the processing in ACT 170 is performed, the control unit 110 terminates the processing of the flowchart illustrated in FIG. 5. The cleaning promotion image is an example of a first image.

On the other hand, when determining that the count value acquired in ACT 110 is less than the second threshold value THB (ACT 120—NO), the control unit 110 determines whether the output information output processing starts (ACT 150). In FIG. 5, the processing in ACT 150 is indicated by "output information output processing in progress?".

When determining that the output information output processing starts (ACT 150—YES), the control unit 110 terminates the output information output processing (ACT 160) and terminates the processing of the flowchart illustrated in FIG. 5.

On the other hand, when determining that the output information output processing does not start (ACT 150—NO), the control unit 110 terminates the processing of the flowchart illustrated in FIG. 5.

In this manner, when determining that the count value counted by the count unit 1105 is equal to or greater than the first threshold value THA, the image forming apparatus 1 outputs, to the information processing device, the output information including information indicating that the count value is equal to or greater than the first threshold value THA. Accordingly, the image forming apparatus 1 can prevent the user from urgently summoning a service person.

In the flowchart illustrated in FIG. 5, if the first threshold value THA and the second threshold value THB are the same value, the processing in ACT 120 may be omitted. In this case, the processing in ACT 150 and the processing in ACT 160 are executed at a timing before the processing in ACT 170 is executed in the case of ACT 130—NO, or at a timing after the processing in ACT 170 is executed in the case of ACT 130—NO. Even in this case, the image forming apparatus 1 can prevent the user from urgently summoning a service person.

(Processing of Prohibiting User from Resetting Count Value in Response to Operation by Service Person)

Figure 6:
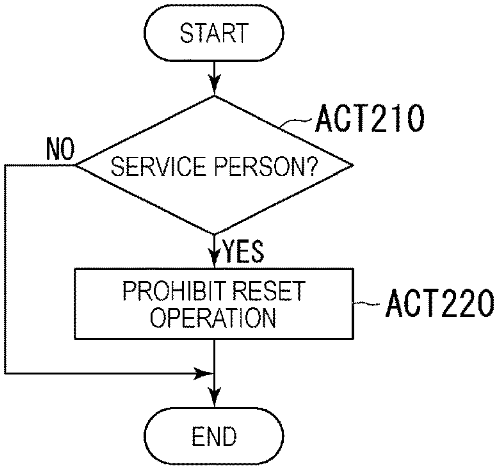
FIG. 6 is a diagram illustrating an example of a flow of processing of prohibiting a user from resetting the count value in response to an operation by a service person.

As described above, if the image forming apparatus 1 displays the cleaning promotion image on the display unit of the control panel 12, the cleaning promotion image continues to be displayed on the display unit until the selection operation is performed on the operation receiving image. For this reason, the user may feel that the cleaning promotion image displayed on the display unit is bothersome, and may end up performing the selection operation on the operation receiving image even though the user does not perform self-maintenance on the target member. This circumstance is undesirable because the target member continues to be used in a state in which self-maintenance is not performed on the target member. Therefore, the image forming apparatus 1 can prohibit the user from resetting the count value in response to an operation by the service person. FIG. 6 is a diagram illustrating an example of a flow of processing of prohibiting the user from resetting the count value in response to the operation by the service person. For example, if the service person inputs a predetermined user reset prohibition command, the image forming apparatus 1 executes the processing in the flowchart illustrated in FIG. 6.

After receiving the user reset prohibition command, the control unit 110 determines whether the person who inputs the user reset prohibition command is the service person (ACT 210). In FIG. 6, processing in ACT 210 is indicated by "service person?". In ACT 210, a method of determining whether the person who inputs the user reset prohibition command is the service person may be a known method or a method to be developed in the future. For example, the processing in ACT 210 may be implemented by user authentication using an integrated circuit (IC) chip included in an employee ID card owned by the service person, or may be implemented by other methods.

When determining that the person who inputs the user reset prohibition command is not the service person (ACT 210—NO), the control unit 110 terminates the processing of the flowchart illustrated in FIG. 6.

On the other hand, when determining that the person who inputs the user reset prohibition command is the service person (ACT 210—YES), the control unit 110 disables the operation of the reset unit 1106 and prohibits the user from resetting the count value (ACT 220). In this case, for example, when displaying the cleaning promotion image on the display unit of the control panel 12, the control unit 110 grays out the operation receiving image included in the cleaning promotion image and displays the cleaning promotion image on the display unit. Accordingly, in this case, the image forming apparatus 1 can more reliably prevent the user from performing the selection operation on the operation receiving image. After the processing in ACT 220 is performed, the control unit 110 terminates the processing of the flowchart illustrated in FIG. 6.

Figure 7:
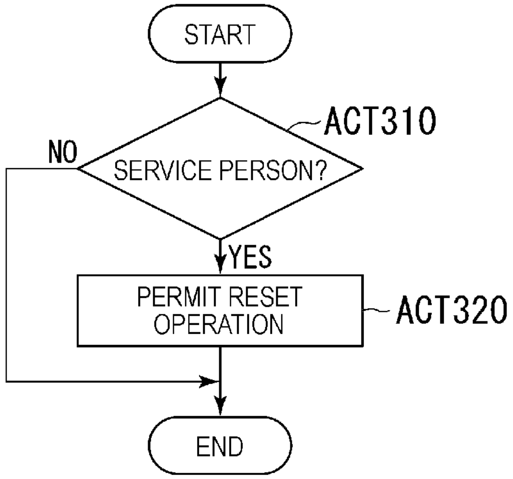
FIG. 7 is a diagram illustrating an example of a flow of processing of allowing the user to reset the count value in response to an operation by the service person.

The reset of the count value by the reset unit 1106, which is prohibited as described above, is permitted, for example, if the image forming apparatus 1 executes processing of a flowchart illustrated in FIG. 7. FIG. 7 is a diagram illustrating an example of a flow of processing of allowing the user to reset the count value in response to an operation by the service person. For example, if the service person inputs a predetermined user reset permission command, the image forming apparatus 1 executes the processing of the flowchart illustrated in FIG. 7.

After receiving the user reset permission command, the control unit 110 determines whether the person who inputs the user reset permission command is the service person (ACT 310). In FIG. 7, the processing in ACT 310 is indicated by "service person?". The processing in ACT 310 is similar to the processing in ACT 210. Therefore, in this embodiment, a detailed description of the processing in ACT 310 will be omitted.

When determining that the person who inputs the user reset permission command is not the service person (ACT 310—NO), the control unit 110 terminates the processing of the flowchart illustrated in FIG. 7.

On the other hand, when determining that the person who inputs the user reset permission command is the service person (ACT 310—YES), the control unit 110 enables the operation of the reset unit 1106 and allows the user to reset the count value (ACT 320). In this case, for example, when displaying the cleaning promotion image on the display unit of the control panel 12, the control unit 110 displays the cleaning promotion image on the display unit without graying out the operation receiving image included in the cleaning promotion image. Accordingly, the user can perform the selection operation on the operation receiving image in this case. After the processing in ACT 320 is performed, the control unit 110 terminates the processing of the flowchart illustrated in FIG. 7.

As described above, the image forming apparatus according to the embodiment (in the example described above, the image forming apparatus 1) includes: a member, the self-maintenance of which is performable by a user (in the example described above, the target members such as the charging member 3122 of the charging charger 312 and the slit glass of the exposure scanning head 313); a printing unit configured to print an image on a printing medium (in the example described above, the image forming unit 113); a count unit configured to count a count value (in the example described above, the usage time of the target member itself and the number of sheets printed by the printer unit 11) indicating usage time of the member (in the example described above, the count unit 1105); and a control unit configured to output, when determining that the count value counted by the count unit is equal to or greater than a first threshold value (in the example described above, the first threshold value THA), output information including information indicating that the count value is equal to or greater than the first threshold value to an information processing device (in the example described above, the control unit 110). Thereby, the image forming apparatus can prevent the user from urgently summoning a service person.

The image forming apparatus further includes a reset unit configured to reset the count value in response to a received operation (in the example described above, the reset unit 1106). If the control unit sets a value equal to or less than the first threshold value to a second threshold value (in the example described above, the second threshold value THB), and the count value is equal to or greater than the second threshold value, the control unit may be configured to display a first image (in the example described above, the operation receiving image) that urges the user to perform self-maintenance and receives an operation of causing the reset unit to reset the count value on a display unit (in the example described above, the display unit of the control panel 12). Here, when determining that the count value is equal to or greater than the first threshold value, the control unit may be configured to output output information including information indicating that maintenance by the service person is required to the information processing device, to display the first image on the display unit, and to prohibit the reset unit from resetting the count value in response to an operation received from the service person.

The image forming apparatus may use a configuration in which the count value is the usage time of the printing unit or the number of sheets printed by the printing unit.

In the image forming apparatus, the printing unit includes: an image carrier (in the example described above, the photoreceptor drum 311); a charging charger that charges the image carrier (in the example described above, the charging charger 312); and an exposure unit configured to form an electrostatic latent image on the surface of the image carrier (in the example described above, the exposure scanning head 313). Here, the exposure unit includes a slit glass, and the member, the self-maintenance of which is performable by the user, may be the charging charger or the slit glass.

In the image forming apparatus, the control unit may be configured to periodically determine whether the count value is equal to or greater than the first threshold value.

In the image forming apparatus, when determining that the count value is equal to or greater than the first threshold value, the control unit may be configured to start periodically outputting, to the information processing device, the output information including the information indicating that the count value is equal to or greater than the first threshold value. Meanwhile, when determining that the count value is less than the first threshold value and starting periodically outputting the output information to the information processing device, the control unit may be configured to terminate periodically outputting the output information to the information processing device.

A program according to the embodiment is a program that controls an image forming apparatus including a member, the self-maintenance of which is performable by a user, and a printing unit configured to print an image on a printing medium. Here, when counting a count value indicating usage time of the member and determining that the counted count value is equal to or greater than a first threshold value, the program outputs, to an information processing device, output information including information indicating that the count value is equal to or greater than the first threshold value. Accordingly, the program can prevent a user from urgently summoning a service person.

Although several embodiments of the present disclosure are described, these embodiments are presented as examples and are not intended to limit the scope of the disclosure. These embodiments can be implemented in various other forms, and various omissions, substitutions, and changes can be made without departing from the gist of the disclosure. These embodiments and modifications thereof are included within the scope and gist of the disclosure as well as within the scope of the disclosure described in the claims and equivalents thereto.

A program adopted to implement the functions of any components in the apparatus described above (for example, the image forming apparatus 1) may be recorded in a computer-readable recording medium, and the program may be read and executed by a computer system. The "computer system" herein includes an operating system (OS) and hardware such as peripheral devices. The term "computer-readable recording medium" refers to portable media such as a flexible disk, a magneto-optical disk, an ROM, and a compact disk (CD)-ROM, and a storage device such as a hard disk built into the computer system. The "computer-readable recording medium" also includes a medium that stores a program for a certain period of time, such as a volatile memory (RAM) in the computer system serving as a server or a client if the program is transmitted via a network such as the Internet or a communication line such as a telephone line.

The program may be transmitted from a computer system storing this program in a storage device or the like to another computer system via a transmission medium or by a transmission wave in the transmission medium. The "transmission medium" that transmits the program refers to a medium that has a function of transmitting information, such as a network (a communication network) such as the Internet or a communication line such as a telephone line.

The program may be used to implement some of the functions described above. The program may be a so-called difference file (a difference program) that can implement the above-described functions in combination with a program already recorded in the computer system.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus, comprising:

a printing component comprising a member, self-maintenance of which is performable by a user, the printing component configured to print an image on a printing medium;

a count component configured to count a count value indicating usage time of the member;

a reset component configured to reset the count value in response to a selectable operation;

a storage component configured to store a first threshold value and a second threshold value which is equal to or less than the first threshold value; and a controller configured to:

when determining that the count value counted by the count component is equal to or greater than the second threshold value and less than the first threshold value, display a first image on a display, wherein the first image urges the user to perform the self-maintenance and comprises the selectable operation of causing the reset component to reset the count value, when determining that the count value counted by the count component is equal to or greater than the first threshold value, periodically output an output information to an information processing device, wherein the output information comprises information indicating that maintenance by a service person is required, and prohibit the reset component from resetting the count value in response to an operation received from the service person, and when determining that the count value counted by the count component is less than the second threshold value and if the output information has started to be output to the information processing device in response to the controller determining that the count value counted by the count component is equal to or greater than the first threshold value, terminate the output of the output information to the information processing device.

2. The image forming apparatus according to claim 1, wherein the count value is the usage time of the printing component or the number of sheets printed by the printing component.

3. The image forming apparatus according to claim 1, wherein:

the printing component comprises an image carrier, a charging charger that charges the image carrier, and an exposure component configured to form an electrostatic latent image on a surface of the image carrier;

the exposure component includes a slit glass; and the member is the charging charger or the slit glass.

4. The image forming apparatus according to claim 1, further comprising:

a cleaning member configured to remove at least one of an oxidation product or toner adhering to a charging member in response to an operation received from the user.

5. The image forming apparatus according to claim 1, further comprising:

a cleaning member that comprises two cleaning pads that slidably sandwich a charging member.

6. A method of controlling an image forming apparatus comprising a printing component comprising a member, self-maintenance of which is performable by a user, the printing component configured to print an image on a printing medium, the method comprising:

counting a count value indicating usage time of the member;

resetting the count value in response to a selectable operation;

when determining that the count value counted by the count component is equal to or greater than a second threshold value and less than a first threshold value, wherein the second threshold value is equal to or less than the first threshold value, display a first image on a display, wherein the first image urges the user to perform the self-maintenance, and wherein the first image comprises the selectable operation of causing the reset component to reset the count value;

when determining that the count value is equal to or greater than the first threshold value, periodically outputting an output information to an information processing device, wherein the output information comprises first information indicating that maintenance by a service person is required, displaying the first image on the display, and prohibiting the reset component from resetting the count value in response to an operation received from the service person; and when determining that the count value is less than the second threshold value and if the output information has started to be output to the information processing device in response to the determining that the count value is equal to or greater than the first threshold value, terminating the output of the output information to the information processing device.

7. The method according to claim 6, wherein the count value is the usage time of the printing component or the number of sheets printed by the printing component.

8. The method according to claim 6, wherein:

the printing component comprises an image carrier, a charging charger that charges the image carrier, and an exposure component configured to form an electrostatic latent image on a surface of the image carrier;

the exposure component comprises a slit glass; and the member is the charging charger or the slit glass.

9. The method according to claim 6, wherein the output information further comprises second information indicating that the count value is equal to or greater than the first threshold value, and further comprising, when determining that the count value is less than the first threshold value and the output information has started to be output to the information processing device in response to the determining that the count value is equal to or greater than the first threshold value, terminating the output of the output information to the information processing device.

10. The method according to claim 6, further comprising:

removing at least one of an oxidation product and toner adhering to a charging member in response to an operation received from the user.

11. A multifunction printer, comprising:

a printing component comprising a member, self-maintenance of which is performable by a user, the printing component configured to print an image on a printing medium;

a count component configured to count a count value indicating usage time of the member; and a reset component configured to reset the count value in response to a selectable operation, a controller configured to:

when determining that the count value counted by the count component is equal to or greater than a second threshold value and less than a first threshold value, wherein the second threshold value is equal to or less than the first threshold value, display a first image on a display, wherein the first image urges the user to perform the self-maintenance and comprises the selectable operation of causing the reset component to reset the count value, when determining that the count value is equal to or greater than the first threshold value, periodically output an output information to an information processing device, wherein the output information comprises information indicating that maintenance by a service person is required, display the first image on the display, and prohibit the reset component from resetting the count value in response to an operation received from the service person, and when determining that the count value is less than the second threshold value and when the output information has started to be output to the information processing device in response to the controller determining that the count value is equal to or greater than the first threshold value, terminate the output of the output information to the information processing device.

12. The multifunction printer according to claim 11, wherein the count value is the usage time of the printing component or the number of sheets printed by the printing component.

13. The multifunction printer according to claim 11, wherein:

the printing component comprises an image carrier, a charging charger that charges the image carrier, and an exposure component configured to form an electrostatic latent image on a surface of the image carrier;

the exposure component comprises a slit glass; and the member is the charging charger or the slit glass.

14. The multifunction printer according to claim 11, wherein the output information further comprises information indicating that the count value is equal to or greater than the first threshold value, and wherein the controller is further configured to: when determining that the count value is less than the first threshold value and the output information has started to be output to the information processing device in response to the controller determining that the count value is equal to or greater than the first threshold value, terminating the output of the output information to the information processing device.

15. The multifunction printer according to claim 11, further comprising:

a cleaning member configured to remove at least one of an oxidation product or toner adhering to a charging member in response to an operation received from the user.

16. The multifunction printer according to claim 11, further comprising:

a cleaning member that comprises two cleaning pads that slidably sandwich a charging member.

* * * * *